UNITED STATES PATENT OFFICE.

ERNST BODMER AND CHARLES DE LA HARPE, OF BASEL, SWITZERLAND, ASSIGNORS TO DYE WORKS FORMERLY L. DURAND, HUGUENIN & CO., OF BASEL, SWITZERLAND.

YELLOW TO RED MORDANT DYESTUFFS AND PROCESS OF MAKING SAME.

1,055,864. Specification of Letters Patent. Patented Mar. 11, 1913.

No Drawing. Application filed July 8, 1912. Serial No. 708,237.

*To all whom it may concern:*

Be it known that we, ERNST BODMER and CHARLES DE LA HARPE, both chemists, citizens of the Swiss Republic, and residents of Basel, Switzerland, have invented new Yellow to Red Mordant Dyestuffs and a Process of Making Same, of which the following is a full, clear, and exact specification.

Nitrated rhodols have not hitherto been known.

By the present invention a whole series of valuable dyestuffs can be obtained by treating rhodols with nitrating agents and transforming the nitrorhodols thus obtained into alkali metal salts.

This process is applicable to the rhodols which are derived from phthalic acid and resorcin and have the general formula:

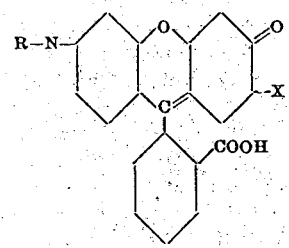

wherein R stands for one or two alkyl, aryl or aralkyl groups, while in X a substituent such as, for instance, COOH, or $SO_3H$ may be present.

The dyestuff to be nitrated is most simply dissolved in sulfuric acid and the necessary proportion of nitric acid added in the form of a mixture of nitric acid and sulfuric acid. In general the rhodols take one molecular proportion of nitric acid. Those which are substituted in the amino group by benzyl or phenyl groups may take more than one molecular proportion of nitric acid.

The new dyestuffs which are thus produced are, like the dyestuffs from which they are derived or the analogous, not nitrated rhodols, mordant dyestuffs as shown by the difference of their dyeings on not mordanted and mordanted fiber. Their tints on chrome-mordanted fiber vary from yellow to red. In distinction from the corresponding not nitrated rhodols, the nitrorhodols dye the fiber more yellowish tints. Their acid character, namely that of the not sulfonated but only carboxylated compounds, is marked; their solubility in alkalis is in consequence enhanced. Certain properties of fastness are favorably affected by the entry of the nitro group, such as the fastness to light of the dyeings with chrome mordants on wool, which is much better than that of the corresponding not nitrated rhodols.

The new dyestuffs are in their serviceable form, that is to say in the form of alkali metal salts brown to red powders, which are easily soluble in water and from these solutions the corresponding acid nitrorhodols are precipitated by adding acid.

Some of the not sulfonated nitro-rhodols may be sulfonated for the purpose of increasing their solubility under certain conditions; obviously, those which contain a benzyl or a phenyl residue in the amino group are particularly easily sulfonated.

The invention is illustrated by the following examples, the parts being by weight:

Example I: 43.9 parts of diamethylrhodolsulfonic acid (free acid of the dyestuff from dimethylamino-meta-oxy-benzoylbenzoic acid and resorcin disulfonic acid, obtained as prescribed in Example II of specification of the United States Letters Patent No. 1002825 dated September 1911 are dissolved in 4 times their weight of concentrated sulfuric acid at ordinary temperature. While stirring and cooling there is added gradually a quantity of a mixture of sulfuric acid and nitric acid, corresponding with 6.3 parts of nitric acid, for instance 14.3 parts of such a mixture containing 44 per cent. of $HNO_3$, sufficient for a mononitro derivative. The nitration is completed by allowing the mixture to stand for several days at the ordinary temperature or by heating for a short time at 70° C.; when free nitric acid can no longer be detected in the mass, the latter is poured into ice-water, the dyestuff which separates is filtered and is converted into an easily soluble alkali metal salt. The dyestuff is distinguished from the parent dyestuff by a more yellow tint. It dissolves in concentrated sulfuric acid with a citron yellow color turning to yellowish red, on addition of water. Its solutions in dilute alkali are yellowish red with a green fluorescence. It dyes unmordanted wool red orange and chrome-mordanted wool orange-red tints.

Example II: 40.3 parts of dimethylrhodolcarboxylic acid (dyestuff from dimethyl-amino-meta-oxy-benzoylbenzoic acid and β-resorcylic acid), or an equivalent quantity of another dyestuff obtained, from an N-substitution derivative of amino-meta-oxybenzoylbenzoic acid and β-resorcylic acid, are dissolved in 4 times the quantity of sulfuric acid monohydrate and there is added gradually while stirring and cooling a quantity of a mixture of nitric acid and sulfuric acid corresponding with 6.3 parts of nitric acid, for instance 18 parts of such a mixture containing 35 per cent. $HNO_3$, 15.3 per cent. $SO_3$ and 49.7 per cent. $H_2SO_4$. The mass is allowed to stand for some time or gently heated for a short time until free nitric acid can no longer be detected. The dyestuff separates when the mass is poured into ice-water; it is dissolved in hot sodium acetate solution, in which it is much more soluble than the parent dyestuff, and is precipitated again from the solution by adding acid. The product is then dissolved in an alkali and salted out. The dyestuff thus obtained in the form of a red powder is distinguished from the parent dyestuff by, in addition to its more yellow tint, a considerably increased fastness to light of its dyeings on chromed wool. It may be dyed on wool with chrome mordants by the one-bath or so-called American process (that is to say, the dyestuff and mordant being in the dye-bath from the beginning) and also by after-chroming. It dissolves in concentrated sulfuric acid to yellow solution becoming yellowish red on addition of water. In dilute alkalis it dissolves to yellowish red solutions of a green fluorescence. It dyes unmordanted wool orange and chrome-mordanted wool red tints.

Example III: 49.3 parts of the dyestuff from ethyl-benzyl-amino-meta-oxybenzoylbenzoic acid and β-resorcylic acid are dissolved in 4 times their weight of sulfuric acid monohydrate and 36 parts of a mixture of nitric acid and sulfuric acid containing 35 per cent. of $HNO_3$, corresponding with 12.6 parts of nitric acid, are gradually added while cooling and stirring. The treatment and the finishing operation are analogous to those described in Example II. The dyestuff thus obtained dyes unmordanted wool yellow and chrome-mordanted wool brown yellow tints fast to fulling and light, whereas the parent dyestuff yields a bluish red tint. It dissolves in concentrated sulfuric acid with a yellow-brown coloration becoming brighter on addition of water and in dilute alkalis with a yellow-brown coloration.

What we claim is:

1. The described process for the manufacture of yellow to red mordant dyestuffs, which consists in treating a rhodol dyestuff with a nitrating agent in a suitable medium and transforming the product thus obtained into an alkali metal salt.

2. The described process for the manufacture of yellow to red mordant dyestuffs, which consists in treating a sulfuric acid solution of a rhodol dyestuff with a nitrating agent and transforming the product thus obtained into an alkali metal salt.

3. The described process for the manufacture of orange red to red dyestuffs, which consists in treating a rhodol dyestuff derived from a dialkylamino-meta-oxybenzoylbenzoic acid with a nitrating agent in a suitable medium and transforming the product thus obtained into an alkali metal salt.

4. The described process for the manufacture of orange-red to red dyestuffs, which consists in treating a rhodol dyestuff derived from a dialkyl-amino-meta-oxybenzoylbenzoic acid and β-resorcylic acid with a nitrating agent in a suitable medium and transforming the product thus obtained into an alkali metal salt.

5. As new products, the described nitrated rhodol dyestuffs in the form of their alkali metal salts constituting in dry state brown to red powders, which are easily soluble in water and precipitated from these solutions by addition of an acid, dyeing chrome mordanted fibers yellow to red tints, which are more yellowish and faster to light than those obtained with the corresponding non-nitrated rhodol dyestuffs, dissolving in concentrated sulfuric acid with yellow to yellow-brown coloration becoming yellowish-red to bright yellow-brown on addition of water and dissolving in dilute alkalis with yellowish red to yellow-brown coloration.

6. As a new article of manufacture the described nitrated rhodol dyestuff resulting from the nitration of the dyestuff in the form of alkali metal salts derived from dimethyl-amino-meta-oxybenzoylbenzoic acid and β-resorcylic acid and the transformation of the nitro derivative into an alkali metal salt, which constitutes in dry state a red powder easily soluble in water and can be precipitated from these solutions by addition of an acid, dyes chrome mordanted fibers red tints, which are more yellow and faster to light than those obtained with the corresponding non-nitrated rhodol dyestuff, dissolves in concentrated sulfuric acid with yellow coloration turning to yellowish red on addition of water and dissolves in dilute alkalis to yellowish red solutions of green fluorescence.

In witness whereof we have hereunto signed our names this 24th day of June, 1912, in the presence of two subscribing witnesses.

ERNST BODMER.
CHARLES DE LA HARPE.

Witnesses:
GEO. GIFFORD,
AMAND RETTERY.